STEPPING SYSTEM

Filed July 11, 1955 2 Sheets-Sheet 1

INVENTOR.
JOHN E. RICHARDSON
BY
Ellsworth R. Roston
ATTORNEY

July 25, 1961 J. E. RICHARDSON 2,994,068

STEPPING SYSTEM

Filed July 11, 1955 2 Sheets-Sheet 2

INVENTOR.
JOHN E. RICHARDSON
BY
Ellsworth R. Roston
ATTORNEY

United States Patent Office 2,994,068

Patented July 25, 1961

2,994,068

STEPPING SYSTEM

John E. Richardson, Los Angeles, Calif., assignor to The Magnavox Company, Los Angeles, Calif., a corporation of Delaware Filed July 11, 1955, Ser. No. 521,173
9 Claims. (Cl. 340—174)

This invention relates to stepping systems and more particularly to systems for receiving a sequence of signals representing digital information and stepping the signals sequentially along upon the occurrence of successive clock signals to produce a sequence of output signals corresponding to the pattern of input signals.

Digital computers and data processing systems have been built in recent years to perform a large number of different functions. For example, digital computers have been built to solve complex mathematical problems, and data processing systems have been built to control inventory and the automatic movements of a cutting tool. Because of the advances made in digital computers, automation in many fields appears to be feasible.

The digital computers and data processing systems presently being built generally use binary information which is sequentially presented in various patterns to represent different numbers. For example, a sequential presentation of binary indications in a pattern of 0110100 represents in binary form a decimal value of "52," where the least significant digit is at the right. Binary indications of "1" are represented by signals having first characteristics such as a high amplitude and binary indications of "0" are represented by signals having a second amplitude.

In order to obtain a proper operation of digital computers and data processing systems, information obtained by the computer and data processing system must be retained for subsequent use. This has been accomplished in a number of ways. One way has been to store the information on a magnetic drum and recirculate the information so as to make it available for use at a subsequent time. The recirculation of information on drums has been somewhat disadvantageous because it has involved the use of rotating machinery, which has tended to restrict the speed at which computation can be made. Another way of storing information has been to use delay lines of various kinds such as mercury or electrostatic lines. These lines have been disadvantageous for various reasons including their lack of reliability and their excessive lengths.

This invention provides a stepping system which is reliable and compact and which requires no moving parts. The system includes a plurality of circuits formed from magnetic members, each of which has a primary winding, a secondary winding and a core saturable with flux of opposite polarities. Each circuit is formed in part by the secondary winding of a different magnetic member and the primary winding of the next magnetic member. Each circuit also includes at least one unidirectional member such as a diode and a load such as a resistance. The windings and diodes in each circuit are so connected that a flow of magnetizing current through the secondary winding saturates the associated core in one direction and a flow of magnetizing current through the primary winding saturates the associated core in the opposite direction.

A source of cyclic energy is adapted to be introduced to each circuit. In alternate half cycles, magnetizing current flows through the primary winding in the circuit when the core associated with the secondary winding in the circuit has previously been saturated with a particular polarity of magnetization. In the same half cycles, magnetizing current does not flow through the primary winding in the circuit when the core associated with the secondary winding in the circuit is saturated with flux having a polarity opposite to the particular polarity. In this way, each core becomes saturated sequentially with flux upon the occurrence of alternate half cycles of energy in accordance with the saturation of flux in the preceding core. By such an arrangement, the digital information represented by the sequential pattern of signals becomes stepped into successive cores in the system.

In the other half cycles of cyclic energy, the circuits become opened by the operation of the diodes in the circuit. In such half cycles, signals representing digital information are introduced to the primary winding of the first magnetic member. The signals representing binary values of "1" produce a saturation of the core in the first member in one direction and the signals representing binary values of "0" produce a saturation of the core in the opposite direction. As previously described, the polarity of core saturation in turn controls the flow or lack of flow of magnetizing current through the primary winding of the next magnetic member in the following half cycle of cyclic energy. By this relationship, the signals introduced to the first primary winding are transferred to successive primary windings in subsequent half cycles of cyclic energy.

An object of this invention is to provide a system for stepping digital information along at regular intervals.

Another object is to provide a system which uses magnetic principles and requires no moving parts to step along digital information.

A further object is to provide a magnetic system which obtains a stepping action even though only a limited number of components is used in each stage.

Still another object is to provide a stepping system which uses a plurality of magnetic members each having a saturable core to control the production of binary signals in accordance with the saturation of the core in one direction or the other.

Other objects and advantages will be apparent from a detailed description of the invention and from the appended drawings and claims.

Figure 1:
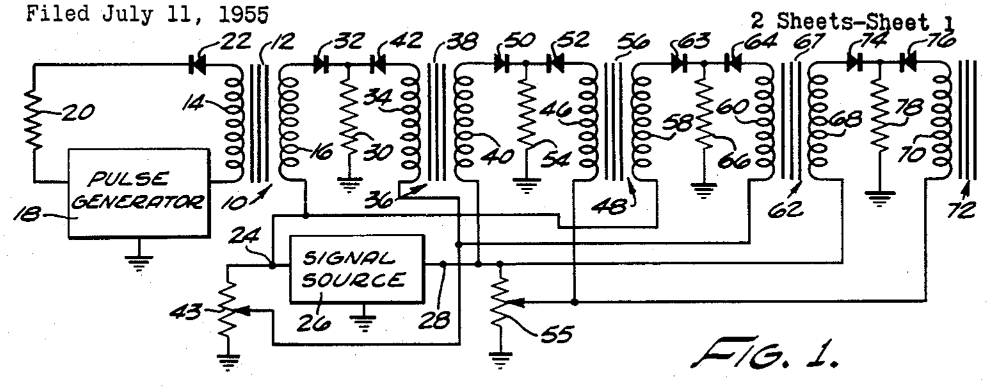
FIGURE 1 is a somewhat schematic view, partly in block form, illustrating several stages of a stepping system constituting one embodiment of the invention.

In the embodiment of the invention shown in FIGURE 1, a magnetic member generally indicated at 10 includes a saturable core schematically illustrated at 12. The core 12 may be made from a suitable material having saturable magnetic properties and it may be provided with a toroidal or any other suitable shape. For example, the core 12 may be made from a ferrite material designated as S1, S2 or S3 by the General Ceramic and Steatite Corporation of Keasbey, New Jersey. This material is a ferro-magnetic ceramic molded from powdered particles.

Current conductors such as windings 14 and 16 are disposed in magnetic proximity to the core 12. Preferably, the windings 14 and 16 may be formed from one or more turns wrapped around the core 12 so as to produce an optimum magnetic coupling with the core. The windings 14 and 16 are provided with a sufficient number of ampere-turns to saturate the core 12 with magnetic flux as will be described in detail subsequently. The windings 14 and 16 may be provided with substantially equal numbers of turns but other turn ratios may also be employed. The winding 14 may be considered as the primary winding and the winding 16 as the secondary winding of the magnetic member 10.

The winding 14 is connected to a pulse generator indicated in block form at 18. The pulse generator 18 is adapted to provide signals having first characteristics to indicate first digital information and signals having different characteristics to indicate second digital information. For example, the pulse generator 18 is adapted to provide pulses of positive amplitude to indicate digital values of "1" or a true state. For digital values of "0" or a false state, the pulse generator 18 may provide either no signal or signals of a negative amplitude. The signals produced by the pulse generator 18 may correspond to the signals obtained from a computer or data processing system. For example, the signals may be obtained from a "read" head disposed in contiguous relationship to a magnetic drum of a digital computer.

The primary winding 14 and the pulse generator 18 are in series with a resistance 20 and a unidirectional member such as a diode 22. The diode 22 is connected in the circuit to pass signals of positive amplitude from the pulse generator 18. As will be described in detail subsequently, these signals produce a flow of current through the primary winding 14 in such a direction as to saturate the core 12 with flux of a polarity opposite to that produced by any current which may be made to flow through the secondary winding 16.

The secondary winding 16 is connected to one output terminal 24 of a signal source indicated in block form at 26. The source 26 is adapted to produce cyclic signals of alternating polarity at the output terminal 24 and a second output terminal 28. The signals may have a sinusoidal wave shape or any other suitable wave shape. Furthermore, the wave forms and the maximum amplitudes of the positive half cycles may be the same as or different from the wave forms and maximum amplitudes of the negative half cycles. The secondary winding 16 and the source 26 are in a series circuit with a grounded resistance 30 and a unidirectional member such as a diode 32. The diode 32 is connected in the series circuit in a direction for passing current only in the positive half cycles of the alternating voltage from the source 26.

The signal source 26 is also adapted to introduce voltage to the primary winding 34 of a magnetic member generally indicated at 36. The magnetic member 36 corresponds substantially in construction and operation to the magnetic member 10 and includes a core 38 and a secondary winding 40 in addition to the primary winding 34. The primary winding 34 of the magnetic member 36 is connected to a unidirectional member such as a diode 42. The diode 42 is connected in a direction to pass current upon the occurrence of positive voltages on the terminal 24 of the source 26. A connection is also made from the primary winding 34 to the movable contact of a rheostat 43 having one stationary contact grounded and the other stationary contact connected to the output terminal 24 of the signal source 26.

The voltage on the output terminal 28 of the signal source 26 is introduced directly to the secondary winding 40 of the magnetic member 36 and is also applied with reduced amplitude to a primary winding 46 of a magnetic member generally indicated at 48. The windings 40 and 46, a pair of diodes 50 and 52 and a resistance 54 form circuitry similar to that described above for the windings 16 and 34, the diodes 32 and 42 and the resistance 30. However, as previously described, the secondary winding 40 is connected to the output terminal 28 of the signal source 26. In addition, the primary winding 46 is connected to the movable contact of a rheostat 55. One stationary contact of the rheostat 55 is grounded and the other stationary contact of the rheostat is provided with a common connection with the output terminal 28 of the signal source 26.

The magnetic member 48 corresponds in construction and operation to the members 10 and 36 and includes a core 56 and a secondary winding 58 in addition to the primary winding 46. The secondary winding 58 and a primary winding 60 of a magnetic member generally indicated at 62 are associated with each other in circuitry similar to that described above for the windings 16 and 34. This circuitry includes diodes 63 and 64 and a resistance 66. Connections are respectively made from the windings 58 and 60 to the output terminal 24 of the source 26 and to the movable contact of the rheostat 43.

A core 67 and a secondary winding 68 are also included in the magnetic member 62. The secondary winding 68 is associated in circuitry with the primary winding 70 of a magnetic member generally indicated at 72. This circuitry includes diodes 74 and 76 and a resistance 78. The windings 68 and 70 are connected to the output terminal 28 of the source 26 and to the movable contact of the rheostat 55, respectively.

Since the magnetic members 10, 36, 48, 62 and 72 have similar construction and operating characteristics, their operation should be understood from a description as to the operating characteristics of one of them. This description will be with particular reference to the magnetic member 10. Because of the particular material from which the core 12 in the memory member 10 is made, the core has a substantially rectangular hysteresis loop similar to that shown in FIGURE 2. In the curve shown in FIGURE 2, the ampere-turns applied to the core are represented along the horizontal axis of the core and the flux produced by the ampere-turns is represented along the vertical axis of the curve.

Figure 2:
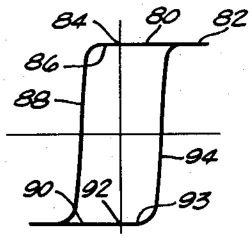
FIGURE 2 is a curve illustrating performance characteristics of various saturable-core magnetic members included in the system shown in FIGURE 1.

As indicated at 80 in FIGURE 2, the core 12 becomes saturated with magnetic flux of a positive polarity when a sufficient number of positive ampere-turns are applied to the winding 14. When the core 12 becomes saturated, increases in the ampere-turns applied to the winding 14 produce no appreciable increase in the amount of flux traveling through the core. This is indicated at 82 in FIGURE 2. Since no appreciable increase in flux is obtained upon the production of the saturating level indicated at 80, a relatively small voltage is induced in the winding 16 when the ampere-turns applied to the winding 14 are increased. This indicates that the impedance presented by the windings 14 and 16 becomes relatively low upon the occurrence of a saturating flux.

Upon the interruption of the current flowing through the winding 14, a residual flux remains in the core 12. This residual flux is of a sufficient intensity to saturate the core 12, as indicated by a position 84 in FIGURE 2 corresponding to a "0" value of ampere-turns in the winding 14. When a small number of negative ampere-turns is applied to the winding 16, the flux in the core 12 remains at substantially the saturating level, as indicated at 86 in FIGURE 2. This causes the flux to return to substantially the saturating level 84 when the small number of negative ampere-turns is interrupted.

Upon the imposition of an increased number of ampere-turns, the core 12 operates in a dynamic region. This region is indicated at 88 in FIGURE 2. In this region only a small increase in the number of negative ampere-turns causes the flux in the core to change from the positive saturating level 80 to a negative saturating level 90. When a negative flux of saturating intensity 90 is produced in the core 12, it remains in the core even upon the interruption of the ampere-turns applied to the core. This residual flux of negative polarity is indicated at 92 in FIGURE 2.

In like manner, an application of a relatively small number of positive ampere-turns causes the core 12 to operate in a region 93. This region is similar to the region 86 described above in that the core returns to the saturating intensity 92 upon an interruption in the ampere-turns applied to the core. The application of an increased number of positive ampere-turns to the core 12 causes the core to operate in a dynamic region 94. In this region, the core changes abruptly from a negative saturation to a positive saturation when the ampere-turns applied to the core are only slightly increased. The positive saturation is at the level 80 described above.

Since the core 12 has the properties of retaining a considerable amount of magnetic flux after the application of ampere-turns to the core, the magnetic member formed by the core and the windings on the core is able to serve as a memory. The magnetic member is able to serve as a memory because it stores positive or negative magnetic flux in the core corresponding to the magnetizing currents flowing through the windings 14 and 16. The operation of the system shown in FIGURE 1 in forming and using the magnetic fluxes will be described in detail subsequently.

Figure 3:
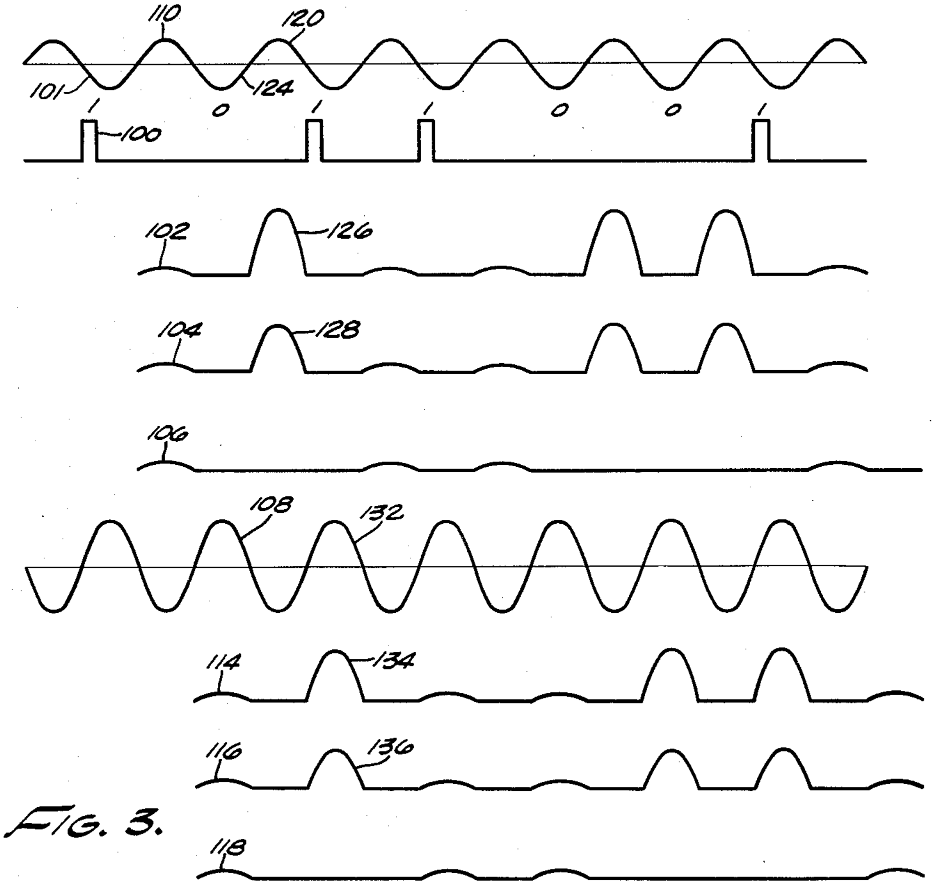
FIGURE 3 shows a plurality of curves of voltage and current wave forms at strategic terminals in the system shown in FIGURE 1.

As previously described, digital indications of "1" or a "true" state may be indicated by pulses having positive amplitudes. When a positive pulse such as that indicated at 100 in FIGURE 3 is produced by the generator 18, it causes current to flow through a circuit including the generator, the primary winding 14, the diode 22 and the resistance 20. This current has a sufficient amplitude and duration to saturate the core 12 with flux of a positive polarity such as that indicated at 80 in FIGURE 2.

The current produced by the signal 100 flows through the winding 14 during the occurrence of a negative half cycle of voltage from the source 26, such as that indicated at 101 in FIGURE 3. A negative voltage from the source 26 is indicated by a negative voltage on the output terminal 24 and a positive voltage on the output terminal 28. This causes the diode 32 to present an infinite impedance to the secondary winding 16. Because of the infinite impedance presented to the secondary winding 16, current cannot flow through the winding during the half cycle of voltage 101 even though a voltage is induced in the winding by the flow of current through the primary winding 14. This causes the saturation of the core 12 to be controlled entirely by the flow of current through the primary winding 14.

In the next half cycle of voltage from the source 26, a positive voltage is produced at the terminal 24 and a negative voltage at the terminal 28. This causes current to flow through a circuit including the source 26, the secondary winding 16, the diode 32 and the resistance 30. The current has a relatively low amplitude because the core 12 has previously been saturated with a polarity of flux opposite to that produced by the flow of current through the winding 16. Thus, the current may have a relatively small amplitude such as that indicated at 102 in FIGURE 3.

Because of the flow of only the magnetizing current 102 through the circuit including the source 26, the winding 16, the diode 32 and the resistance 30, a relatively low voltage is produced across the resistance. This voltage is indicated at 104 in FIGURE 3. As will be seen, the voltage 104 has a wave shape corresponding substantially to that of the current 102. The low voltage produced across the resistance 30 causes a relatively low voltage to be applied to the cathode of the diode 42. This voltage is less than that applied to the plate of the diode from the movable contact of the rheostat 43. As a result, a magnetizing current flows through a circuit including the source 26, the rheostat 43, the primary winding 34, the diode 42 and the resistance 30. This magnetizing current is indicated at 106 in FIGURE 3. As will be seen, the magnetizing current 106 through the primary winding 34 has characteristics similar to the magnetizing current 102 through the secondary winding 16.

The current 102 flowing from the source 26 through the secondary winding 16 has a sufficient amplitude and duration to saturate the core 12 with flux of a negative polarity. This causes a flux level indicated at 90 in FIGURE 2 to be produced in the core 12. At the same time, the magnetizing current flowing through the primary winding 34 causes the core 38 to become saturated with flux of a positive polarity such as that indicated at 80 in FIGURE 2. In this way, the cores 12 and 38 become respectively saturated at the same time with fluxes of opposite polarities.

Because of the particular connections made to the windings 40 and 46 in the next circuit, positive voltages are applied to the windings 40 and 46 in the next half cycle of voltage from the source 26. This half cycle is indicated at 108 in FIGURE 3 and is the one immediately following the half cycle 110 in which the magnetizing currents 102 and 106 are produced through the windings 16 and 34.

Upon the introduction of the positive voltage 108 to the winding 40, current flows through the winding. This current is limited to a magnetizing intensity because of the previous saturation of the core 38 in an opposite polarity by the flow of the magnetizing current 106 through the primary winding 34. The magnetizing current flowing through the winding 40 is indicated at 114 in FIGURE 3. It flows through a circuit including the source 26, the winding 40, the diode 50 and the resistance 54 and causes a relatively low voltage such as that indicated at 116 in FIGURE 3 to be produced across the resistance.

The relatively low voltage produced across the resistance 54 causes the voltage on the cathode of the diode 52 to be less than that introduced to the plate of the diode from the movable contact of the rheostat 55. A resultant current flows through a circuit including the source 26, the rheostat 55, the primary winding 46, the diode 52 and the resistance 54. As indicated at 118 in FIGURE 3, the current flowing through the winding 46 has a relatively low amplitude sufficient to magnetize the core 56 with positive flux of the saturating intensity 90.

The next half cycle of voltage from the source 26 provides at the output terminals 24 and 28 a polarity of voltage similar to the half cycle 110. This half cycle of voltage is indicated at 120 in FIGURE 3. In this half cycle, magnetizing currents flow through the windings 58 and 60. The wave forms of the magnetizing currents flowing through the windings 58 and 60 are not shown in FIGURE 3 but their characteristics are similar to the wave forms 102 and 106 in FIGURE 3. Since a magnetizing current flows through the winding 60, it prepares the secondary winding 68 for the flow of magnetizing current in the next half cycle of voltage from the source 26.

In this way, an indication of "1" such as the pulse 100 in FIGURE 3 is transferred sequentially to successive circuits upon the production of half cycles by the source 26. Input signals corresponding to the signal 100 and representing digital values of "1" are represented in each circuit by a relatively low voltage across the resistive load in the circuit such as the resistance 30. For example, the input signal 100 causes the signal 102 to be produced across the resistance 30 in a first half of cyclic energy from the source 26 and the signal 116 to be produced across the resistance 54 in the next half cycle.

As previously described, digital values of "0" may be represented by input signals of negative amplitude or by no signals at all. For example, when the voltage at the output terminal 24 of the source 26 is undergoing a negative half cycle of voltage indicated at 124 in FIGURE 3, the absence of any signal from the pulse generator 18 indicates a digital value of "0." Since the generator 18 is not producing any voltage at this time, no current is able to flow through the primary winding 14. This causes the core 12 to remain saturated with negative flux indicated at 90 in FIGURE 2. This flux was produced in the previous half cycle 110 by the flow of the magnetizing current 102 through the secondary winding 16.

In the positive half cycle 120 following the negative half cycle 124, current is able to flow through a circuit including the source 26, the secondary winding 16, the diode 32 and the resistance 30. This current is not limited to a magnetizing amplitude by the action of the secondary winding 16. The reason for this is that the core 12 is already saturated with flux of negative polarity similar to that which would be produced by the flow of current through the secondary winding. This causes the secondary winding 16 to present a relatively low impedance, as described fully above. Since the diode 32 also has a low impedance in the forward direction, the amplitude of the current flowing through the circuit is limited almost entirely by the value of the resistance 30. In this way, current of relatively large amplitude flows through the resistance 30 during the positive half cycle 120. This current is indicated at 126 in FIGURE 3. The current produces a voltage of large amplitude across the resistance 30 such as that indicated at 128 in FIGURE 3.

The voltage 128 across the resistance 30 is introduced to the cathode of the diode 42 during the positive half cycle of voltage 120. This voltage biases the diode to prevent the flow of current through a circuit including the source 26, the primary winding 34, the diode 32 and the resistance 30. The bias on the cathode of the diode 42 is greater than the voltage applied to the plate since only a fraction of the voltage on the output terminal 24 of the source 26 is applied to the movable contact of the rheostat 43. Since magnetizing current is unable to flow through the primary winding 34 of the magnetic member 36, the core 38 remains saturated with flux of negative polarity such as that indicated at 90 in FIGURE 2. This flux was produced in the previous half cycle 108 by the flow of magnetizing current through the secondary winding 40 of the magnetic member 36.

In like manner, a positive voltage 132 is produced on the output terminal 28 of the source 26 in the next half cycle following the half cycle 120. This voltage causes current to flow through a circuit including the source 26, the winding 40, the diode 50 and the resistance 54. The current is limited only by the resistance 54. This results from the fact that the impedance presented by the winding 40 is relatively low because of the negative flux saturation previously produced in the core 38. As a result, current of large amplitude such as that indicated at 134 in FIGURE 3 flows through the resistance 54 and produces a relatively large voltage across the resistance. This voltage is indicated at 136 in FIGURE 3.

Because of the large flow of current through the resistance 54, the cathode of the diode 52 becomes positively biased with a sufficient intensity to prevent the flow of current through a circuit including the source 26, the secondary winding 46, the diode 52 and the resistance 54. Current cannot flow through the circuit since a relatively low voltage is applied to the plate of the diode 52 from the movable contact of the rheostat 55. Since current cannot flow through the circuit including the primary winding 46, the core 56 remains saturated with the negative flux produced in the core by the flow of current through the secondary winding 58 in the previous half cycle of voltage from the source 26. This negative saturation of flux in the core 56 causes the core to present a relatively low impedance in the next half cycle of voltage from the source 26, such that a large current flows through a circuit including the source, the winding 58, the diode 63 and the resistance 66.

It will be seen from the above discussion that indications representing digital values of "0" are transferred sequentially to successive circuits upon the production of half cycles of voltage by the source 26. For example, an indication of "0" produced in the half cycle 124 is transferred to the core 38 in the half cycle 120 and to the core 56 in the half cycle 132. These transfers are represented by high voltages across the loads such as the resistances 30 and 54 in FIGURE 1. The wave forms 128 and 136 respectively indicate the voltages across the resistances 30 and 54 in successive half cycles.

Figure 4:
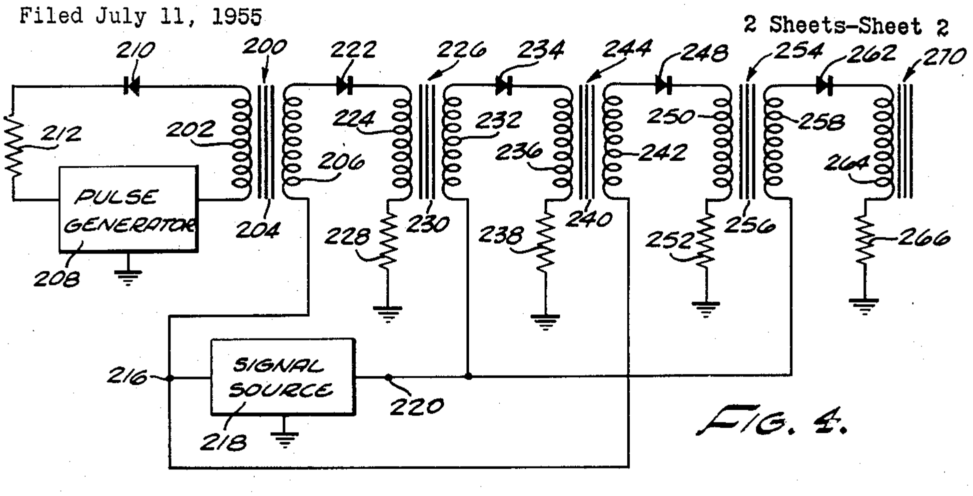
FIGURE 4 is a somewhat schematic view, partly in block form, of a stepping system constituting a second embodiment of the invention.

An advanced embodiment of the invention is shown in FIGURE 4. This embodiment includes a plurality of magnetic members having substantially identical characteristics and having characteristics similar to the magnetic members 10, 36, 48 and 62 in FIGURE 1. One of the magnetic members is generally indicated at 200 in FIGURE 4 and is provided with a primary winding 202, a core 204 and a secondary winding 206. For reasons which will be described in detail subsequently, the secondary winding 206 has at least twice as many turns as the primary winding 202 and preferably has a turns ratio of approximately 3:1 with the primary winding. The primary winding 202 is connected to a pulse generator 208 similar to the pulse generator 18 in FIGURE 1. The winding 202 and the pulse generator 208 are in series with a unidirectional member such as a diode 210 and a load such as a resistance 212.

The secondary winding 206 is adapted to receive cyclic voltage from an output terminal 216 of a signal source 218 having a second output terminal 220. The signal source 218 is adapted to provide cyclic voltage in which the maximum amplitude of the positive half cycles is less than the maximum amplitude of the negative half cycles. The ratio between the peak negative amplitudes and the peak positive amplitudes in alternate half cycles should preferably be at least 2:1 for reasons which will be described in detail subsequently. In order to ensure proper operation, a 3:1 ratio has been used between the peak swings of voltage in the negative and positive directions. A suitable generator for use as the generator 218 is disclosed and claimed in Patent No. 2,777,959 issued to me on January 15, 1957.

The source 218 and the secondary winding 206 are included in a circuit with a unidirectional member such as a diode 222, the primary winding 224 of a magnetic member generally indicated at 226 and a load such as a resistance 228. The diode 222 has its plate connected to the secondary winding 206 and its cathode connected to the primary winding 224 such that current is able to flow through the circuit only for positive voltages on the output terminal 216. Connections are made from the resistance 228 to the primary winding 224 and to ground.

The magnetic member 226 includes a core 230 and a secondary winding 232 in addition to the primary winding 224. The secondary winding 232 is connected to the output terminal 220 of the source 218 and to the plate of a diode 234. The source 218, the secondary winding 232 and the diode 234 are in series with a primary winding 236 and a load such as a resistance 238 having one terminal grounded.

The primary winding 236, a core 240 and a secondary winding 242 are included in a magnetic member generally indicated at 244. The secondary winding 242, a unidirectional member such as a diode 248, a primary winding 250 and a load such as a resistance 252 are included in a circuit with the signal source 218. This circuit is similar to that including the windings 206 and 224 such that the winding 242 is connected to the output terminal 216 and the resistance 252 is grounded at one terminal.

A core 256 couples the primary winding 250 to a secondary winding 258 so as to form a magnetic member generally indicated at 254. The secondary winding 258 and the signal source 218 are included in a circuit with a unidirectional member such as a diode 262, a primary winding 264 and a load such as a resistance 266. The circuit is similar to that including the windings 232 and 236 in that connections are made from the output terminal 220 to the winding 258 and from the resistance 266 to ground. The secondary winding 264 in the circuit forms part of a magnetic member generally indicated at 270.

The pulse generator 208 is adapted to operate in a manner similar to the generator 18 in FIGURE 1 to provide signals representing digital information. For example, the generator 208 may provide signals of positive amplitude representing digital values of "1" and signals of negative amplitude or no signals at all to represent digital values of "0." A pulse representing a digital indication of "1" is indicated at 300 in FIGURE 5. This pulse causes current to flow through a circuit including the generator 208, the primary winding 202, the diode 210 and the resistance 212 in FIGURE 4.

The current flowing from the generator 208 through the winding 202 in FIGURE 4 has a relatively low amplitude. The amplitude is low because the saturation in the core 204 is changing from the negative level of saturation 90 in FIGURE 2 to the positive level of saturation 80. For this reason, the current cannot exceed the value indicated at 94 in FIGURE 2 and measured along the horizontal axis of the curve.

Because of the synchronization in the operation of the generator 208 and the signal source 218, current flows through the winding 202 from the generator 208 during the time that the source 218 is passing through a negative half cycle, as indicated by a negative voltage 304 on the output terminal 216. As previously described, this negative voltage prevents current from flowing through the winding 206 such that the winding presents an infinite impedance.

The negative voltage from the source 218 prevents the flow of current since it applies a negative voltage to the plate of the diode 222. This voltage is equal to any positive voltage induced in the secondary winding 206 by the flow of magnetizing current through the primary winding 202 even through there is a voltage step-up from the primary winding to the secondary winding. Since the secondary winding 206 is presented with an infinite impedance during the negative half cycle of voltage 304 from the source 218, only the current flowing through the primary winding 202 is instrumental in producing flux. This current causes the core 204 to become saturated with positive flux at the end of the pulse 300.

In the next half cycle of voltage from the source 218, a positive voltage 306 is produced on the output terminal 216. This voltage causes current to flow through a circuit including the source 218, the secondary winding 206, the diode 222 and the primary winding 224. Because of the positive saturation previously produced in the core 204 by the flow of current through the primary winding 202, only a magnetizing current flows through the secondary winding 206. This current has a low amplitude as indicated at 308 in FIGURE 5 and produces a voltage of low amplitude across the resistance 228, as indicated at 310 in FIGURE 5. The current causes the core 204 to become shifted in polarity from the positive saturation 80 in FIGURE 2 to the negative saturation 90.

The magnetizing current 308 is able to saturate only the core 204 in the negative direction but is not able to produce any saturation in the core 230. This results from the fact that the secondary winding 206 has approximately three times as many turns as the primary winding 224. Because of this turns ratio, the ampere-turns applied to the winding 206 are sufficient to bring the core 204 into the dynamic region 88. However, the ampere-turns applied to the winding 224 are sufficient to bring the core 230 only into the region 93 in FIGURE 2. As previously described, when a core operates in the region 93, its remanent flux returns to substantially the saturation level 92 upon the interruption of the ampere-turns applied to the core.

Figure 5:
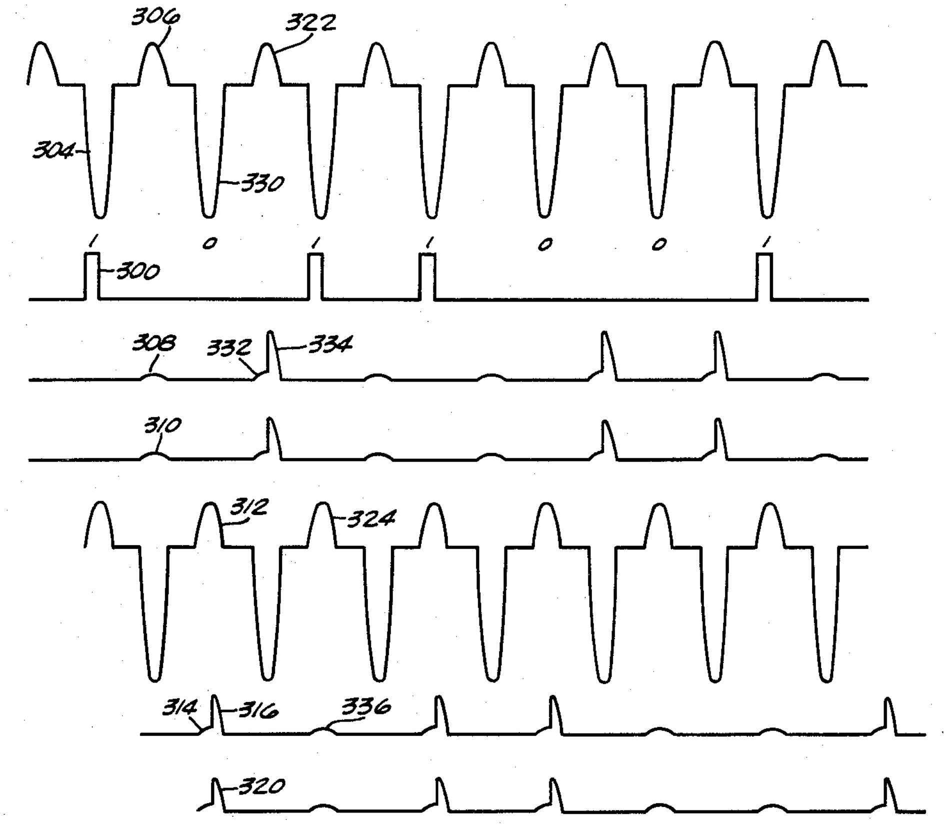
FIGURE 5 shows a plurality of curves of voltage and current wave forms at strategic terminals in the system shown in FIGURE 4.

In the next half cycle of energy from the source 218, a positive voltage is produced on the output terminal 220 of the source, as indicated at 312 in FIGURE 5. This causes current to flow through a circuit including the source 218, the secondary winding 232, the diode 234, the primary winding 236 and the resistance 238. This current is not limited in any material way by the winding 232 since the impedance presented by the winding is low. This results from the fact that the current through the winding 232 would tend to produce negative flux but cannot do so because of the negative flux of saturating intensity already in the core.

Since the impedance presented to the flow of current by the winding 232 is relatively low, the total impedance presented to the flow of current is dependent upon the parameters of the winding 236 and the resistance 238. This impedance is considerably lower than the impedance provided in the circuit when the winding 232 has a high impedance. This causes a relatively large current to flow such that a relatively large number of ampere-turns are produced in the winding 236 even though the number of turns in the winding 236 is relatively low.

The large number of ampere-turns produced in the winding 236 causes the core 240 to become saturated with positive flux at an intermediate time in the half cycle. The magnetizing current flowing through the winding 236 is indicated at 314 in FIGURE 5. Upon the saturation of the core 240, the current flowing in the half cycle 312 becomes limited essentially only by the value of the resistance 238. This causes the current to have a relatively large amplitude as indicated at 316 in FIGURE 5. Since the voltage produced across the resistance 238 is dependent upon the current flowing through the resistance, the voltage has a wave shape indicated at 320 in FIGURE 5.

In the next half cycle of energy from the source 218, a positive voltage is applied to the output terminal 216 as indicated at 322 in FIGURE 5. This causes current to flow through a circuit including the source 218, the secondary winding 242, the diode 248, the primary winding 250 and the resistance 252. Since the core 240 was previously saturated with flux in a negative direction as indicated at 314 and 316 in FIGURE 5, the winding 242 presents a high impedance. This causes current similar to the current 308 to flow through the circuit. The current saturates the core 240 with flux of a positive polarity at the end of the half cycle but has no appreciable effect on the flux in the core 256. This results from the fact that the core 256 operates only in the region 93 as described fully above.

A positive voltage is produced on the output terminal 220 in the half cycle after the voltage swing 322, as indicated at 324 in FIGURE 5. This voltage causes current to flow through a circuit including the source 218, the secondary winding 258, the diode 262, the winding 264 and the resistance 266. Since the core 256 is already saturated with flux of a negative polarity no further flux of any appreciable magnitude can be produced by the flow of current through the winding 258. This causes the winding to be presented with a relatively low impedance as described fully above. For this reason, magnetizing current flows through the primary winding 264 during part of the voltage cycle 234. This current causes the core of the magnetic member 270 to become saturated so that the current is thereafter limited during the half cycle almost entirely by the value of the resistance 266. As a result, the current flowing through the circuit has a wave shape similar to that indicated at 314 and 316 in FIGURE 5.

It will be seen from the above discussion that indications representing digital values of "1" are sequentially transferred from one core to the next in successive half cycles of voltage. The transfer from one core to the next occurs on an inverse basis. For example, the pulse 300 from the generator 208 produces the low voltage 310 across the resistance 228 in the first half cycle following the pulse. In the next half cycle, a high voltage indicated at 320 is produced across the resistance 238.

A low voltage is produced across the resistance 252 in the third half cycle and a high voltage is produced across the resistance 266 in the fourth half cycle. In this way, a low output voltage can be made to represent indications of "1" when the output voltage is taken from odd-numbered circuits and a high output voltage can be made to represent a digital indication of "1" for outputs from even-numbered circuits.

When a digital indication of "0" occurs, the generator 208 produces either a signal of negative amplitude or no signal at all. In either case, no current is able to flow through the primary winding 202 because of the action of the diode 210. This causes the core 204 to continue in its negative state of saturation during a negative pulse of voltage 330 from the source 218.

In the next half cycle of energy from the source 218, the positive voltage 322 is produced on the output terminal 216. This causes current to flow through a circuit including the source 218, the secondary winding 206, the diode 222, the primary winding 224 and the resistance 228. This current is not able to produce any appreciable amount of flux in the core 204 since the core is already negatively saturated. For this reason, the impedance presented by the winding 206 is relatively low. The low impedance presented by the winding 206 causes a magnetizing current to flow through the winding 224, as indicated at 332 in FIGURE 5. The magnetizing current produces a positive saturation of the core 230 before the end of the half cycle 322 so that a large current indicated at 334 can flow through the circuit during the remainder of the half cycle. This current is limited essentially only by the value of the resistance 228.

A positive voltage is produced on the output terminal 220 in the next half cycle of energy from the source 218, as indicated at 324 in FIGURE 5. This voltage produces a flow of current through the windings 232 and 236. The current is limited by the winding 232 because of the relatively great number of turns in the winding. Because of this, the current is sufficient to change the core 230 from a positive saturation to a negative saturation, but it is not able to affect the saturation of the core 240. Since only magnetizing current flows through the windings 232 and 236, the current has a relatively low amplitude as indicated at 336 in FIGURE 5.

In the following half cycle of voltage, current flows through the windings 242 and 250. This current is not limited by the winding 242 because of the negative saturating flux retained in the core 240. For this reason, magnetizing current flows through the winding 250 for a portion of the cycle and saturates the core 256 with positive flux. Thereafter during the half cycle, a relatively large current flows through the circuit, this current being limited essentially only by the value of the resistance 252.

It will be seen that indications of "0" from the generator 208 are sequentially transferred in successive half cycles from one circuit to the next in the stepping system. The sequential transfer occurs in an inverting relationship from one circuit to the next. For example, an indication of "0" is represented in one half cycle by a relatively high voltage across the resistance 228 and in the next half cycle by a relatively low voltage across the resistance 238. This may be seen from the various curves shown in FIGURE 5 for the sequential pattern of input signals in the second horizontal column.

The systems described above have several important advantages. They produce a delay between the time at which digital information is obtained and at which the digital information is made available for subsequent use. This time delay can be set to any desired value by varying the number of circuits included in the stepping system. The reason is that each circuit in the system provides a fixed delay such as a delay of half of a cycle. Actually, delays of various lengths can be obtained for use at different terminals in a computer or data processing system since outputs can be obtained from various circuits in the system.

By stepping input information along for a particular amount of time until the information reaches output terminals, the systems constituting this invention act as a memory. The systems act as memories without the use of any moving parts or rotating machinery, such as is required with a rotary magnetic drum. In this way, considerable space normally required to house a motor and linkage members such as gears is saved. Furthermore, power requirements are materially reduced so that the power supply can be considerably cut down in size.

The systems perform a stepping operation by the use of a plurality of magnetic members having saturable cores and the use of a plurality of unidirectional members such as diodes. The magnetic members and unidirectional members are combined in various circuits such that the saturation of each core controls the saturation produced in the successive core in the next half cycle of cyclic energy. In this way, a stepping operation is obtained. The stepping operation is accomplished with a relatively small number of unidirectional members such as diodes in each stage.

The system shown in FIGURE 4 has even advanced features since it requires only one unidirectional member such as a diode in each stage. This is important in conserving space, especially when a large number of circuits or stages are included. This is true even though each diode in itself does not occupy a large amount of space. Furthermore, the amount of power required to operate the stages is reduced, especially when a large number of stages is included. This is true even though each diode in itself does not consume a large amount of power. By reducing the number of diodes, the wave shape passed from one circuit to the next also tends to be preserved in an optimum form.

Although this invention has been disclosed and illustrated with reference to particular applications, the principles involved are susceptible of numerous other applications which will be apparent to persons skilled in the art. The invention is, therefore, to be limited only as indicated by the scope of the appended claims.

What is claimed is:

1. In combination for producing a sequential stepping of information, a plurality of magnetic members each having a primary winding and a secondary winding and a magnetic core which is saturable in either of a first or a second polarity and which has the property of retaining flux produced in the core after the production of such flux in the core, a plurality of electrical circuits each including the secondary winding of a different one of said plurality of magnetic members and also the primary winding of the next one of said plurality of magnetic members for a flow at particular times of a load current through both the secondary winding and the primary winding of each of the electrical circuits, each of said electrical circuits also including a uni-directional member connected in series with the primary and the secondary windings in the electrical circuit, means for introducing signals of alternating polarity to each of the electrical circuits for producing a saturation of the cores in said first polarity in positive half cycles of the introduced alternating polarity signals, each of said electrical circuits also including a load connected in series with the windings and the uni-directional member in the electrical circuit to develop a relatively large voltage as a result of a flow of load current through the windings of the electrical circuit upon the occurrence of core saturation of said first polarity at the beginning of the positive half cycles of the alternating polarity signals and to develop a relatively small voltage upon the occurrence of core saturation at the end of the positive half cycles of the alternating polarity signals, and means for providing sequences of signals having first characteristics to represent first digital information and for introducing the signals to the primary winding of one of said cores to produce core saturation of said second polarity upon the occurrence of one of the negative half cycles of the alternating polarity signals and the occurrence of a signal having the first characteristics.

2. In combination for producing a sequential stepping of information, a plurality of magnetic members each having a primary winding and a secondary winding and a magnetic core saturable with flux of first or second polarities and provided with properties of flux remanence, a plurality of uni-directional members each connected between the secondary winding of a different one of the plurality of magnetic members and the primary winding of the next magnetic member of the plurality of magnetic members to form an electrical circuit for passing magnetizing current of only a first polarity to the primary winding, the primary and secondary windings of each magnetic member being connected to produce a saturation of the core with flux of the first polarity upon a flow of magnetizing current through the secondary winding and a saturation of the core with flux of the second polarity upon a flow of magnetizing current through the primary winding, the primary and secondary windings of the cores having parameters for obtaining only a saturation of the core coupled to the secondary winding in each electrical circuit upon the flow through the electrical circuit of a current for magnetizing the secondary winding, means for introducing to each electrical circuit cyclic energy for producing in first alternate half cycles a flow of magnetizing current through the secondary winding in the electrical circuit upon a previous flow of current through the primary winding associated with the secondary winding on the same core and for otherwise producing a flow of magnetizing current through the primary winding in the electrical circuit in these first half cycles, and means for introducing to the primary winding of one of the magnetic cores during the other alternate half cycles of cyclic energy first signals representing first digital information and second signals representing second digital information for transfer to successive cores in the plurality of magnetic members.

3. In combination for producing a sequential stepping of information, a plurality of saturable cores each operative to produce saturating fluxes of first and second polarities and each having properties of retaining flux even after the production of such flux in the core, means including a plurality of uni-directional members coupled in circuits between said cores and at least one source of cyclic energy for controlling successive cores to produce core saturations of the first polarity upon the occurrence of cyclic energy of a first polarity from the source and to effectively open the circuits at the uni-directional members upon the occurrence of cyclic energy of the second polarity from the source, means for introducing to one of the cores of the plurality of cores signals having first characteristics to saturate the one core with flux of a second polarity opposite to the first polarity upon the occurrence of one of the successive cycles of energy of the second polarity from the source, and a plurality of loads coupled individually to the plurality of cores in a series relationship with an adjacent core to produce a voltage having first characteristics upon an occurrence of saturating flux of the first polarity in the associated core at each initial introduction of energy of the first polarity from the source and to produce a voltage having second characteristics upon the production of saturating flux of the first polarity in the adjacent one of the cores at a time after each initial introduction of energy of the first polarity from the source and to produce the voltage having second characteristics without changing the polarity of the saturating flux in the adjacent one of the cores.

4. In combination for producing a sequential stepping of information, a plurality of magnetic members each having a primary winding and a secondary winding and a core saturable with fluxes of first or second polarities and provided with properties of flux remanence, a plurality of uni-directional members, a plurality of series circuits each including the secondary winding of a different magnetic member and the primary winding of the next magnetic member and a different uni-directional member in the plurality for the simultaneous flow of a load current through the primary and secondary windings in the circuit to obtain the production of a relatively high voltage, the primary and secondary windings of each magnetic member being connected to produce a saturation of the core in the magnetic member with flux of the first polarity upon the flow of current through the primary winding and a saturation of the core in the magnetic member with flux of the second polarity upon the flow of current through the secondary winding, means for providing cyclic signals and for introducing the signals to each series circuit for preventing any flow of current through the series circuit in first alternate half cycles and for producing a flow of magnetizing current through the secondary winding in the circuit in second alternate half cycles upon a previous flow of current through the primary winding included in the same magnetic member as the secondary winding and for otherwise producing a flow of magnetizing current through the primary winding in the circuit in the second alternate half cycles for at least part of the half cycles, a plurality of loads each connected in a different one of the series circuits, and means for introducing to the primary winding of the first magnetic member in the plurality a sequence of signals having first characteristics to represent first digital information and having second characteristics to represent second digital information to produce a flow of current through the primary winding upon the occurrence of the signals having the first characteristics.

5. In combination for producing a sequential stepping of information, means for producing alternating signals, a plurality of magnetic members each having a primary winding and a secondary winding and a core saturable with flux of opposite polarities and having properties of retaining flux produced in the core even after the production of such flux, the primary and secondary windings of each magnetic member being disposed to produce saturating flux of opposite polarities in their associated core upon the flow of magnetizing current through the winding, a plurality of loads, a plurality of uni-directional members, a plurality of electrical circuits coupled to said providing means, each including in series a different uni-directional member in the plurality of magnetic members, a different load in the plurality of loads, the secondary winding of a different magnetic member in the plurality of magnetic members and the primary winding of the next magnetic member in the plurality of magnetic members to produce in alternate half cycles a flow of magnetizing current through both the secondary winding and the primary winding in the electrical circuit and to provide the magnetizing current with characteristics for saturating either the core magnetically coupled to the secondary winding or the core magnetically coupled to the primary winding in the electrical circuit in accordance with any previous flow of magnetizing current through the primary winding included in the same magnetic member as the secondary winding, and means for introducing to the primary winding of the first magnetic member in the plurality of magnetic members signals having first amplitudes to represent first digital information and signals having second amplitudes to represent second digital information for transfer to subsequent magnetic members in the plurality of magnetic members upon the occurrence of successive signals from the signal means.

6. A combination as set forth in claim 1 in which the primary and secondary windings associated with each core have a turns ratio to obtain a greater control by the secondary winding in each electrical circuit than by the primary winding in each electrical circuit with respect to the flow of magnetizing current through the electrical circuit and in accordance with the polarity of saturation of the core magnetically coupled to the secondary winding at the beginning of such current flow.

7. The combination set forth in claim 3 in which the secondary winding of each magnetic member has more turns than the primary winding of the magnetic member.

8. The combination set forth in claim 4 in which each of the secondary windings of each magnetic member has at least twice as many turns as the primary winding of the member.

9. In combination for producing a sequential stepping of information, a plurality of magnetic members each having a primary winding and a secondary winding and a magnetic core saturable with flux of first and second polarities and provided with properties of flux remanence, a plurality of electrical circuits each including the secondary winding of one magnetic member and the primary winding of the next member for the flow of the same current through both windings in the circuit, a plurality of uni-directional members, there being at least one uni-directional member in each of the electrical circuits to limit the flow of current in a particular direction through the circuit, the windings on the magnetic members being connected in the circuits to produce saturating flux of the first polarity in the cores upon the flow of magnetizing current through the secondary windings, means for introducing to the primary winding of the first magnetic member signals having first characteristics to represent first digital information and signals having second characteristics to represent second digital information and for producing a flow of magnetizing current through the winding upon the introduction of the first signals, and means including at least one source of cyclic energy connected in each circuit for producing a flow of magnetizing current through either the primary winding or the secondary winding in the circuit dependent upon the saturation of the core associated with the secondary winding in representation of the previous transfer of digital information to the circuit so as to obtain a transfer of the information to the core associated with the primary winding in the circuit, each secondary winding being connected to the signal source to receive an alternating voltage having an amplitude less than that simultaneously applied to the primary winding connected to the same load as the secondary winding.

References Cited in the file of this patent

UNITED STATES PATENTS

| | | |
|---|---|---|
| 2,654,080 | Browne | Sept. 29, 1953 |
| 2,710,952 | Steagall | June 14, 1955 |
| 2,770,737 | Ramey | Nov. 13, 1956 |
| 2,812,448 | Kaufmann | Nov. 5, 1957 |
| 2,816,278 | Whitely | Dec. 10, 1957 |
| 2,834,006 | Kaufman | May 6, 1958 |

OTHER REFERENCES

The Single-Core Magnetic Amplifier as a Computer, by R. A. Ramey, appearing on pp. 442 to 446 of the AIEE Transactions, Part I, Communications and Electronics, January 1953. (FIG. 3 appearing on page 443 specifically relied upon.)

"A Review of Magnetic and Ferro-Electric Computing Components," by V. L. Newhouse, pp. 192 to 199 of "Electronic Engineering," May 1954. (FIGS. *5a, 5b, 5c* appearing on p. 195 specifically relied upon.)